S. E. FOSTER, Dec'd.
W. E. HENRY, Adm'r.

HOT-AIR FURNACE.

No. 6,727.

Reissued Nov. 2, 1875.

Witnesses:
James Martin Jr.
J. N. Campbell

Inventor:
Saml. E. Foster by William E. Henry
administrator, by
Macon, Parrish & Lawrence

N. PETERS, PHOTO-LITHOGRAPHER, WASHINGTON, D. C.

UNITED STATES PATENT OFFICE.

JOHN S. PERRY, OF ALBANY, N. Y., ASSIGNEE, BY MESNE ASSIGNMENTS, OF SAMUEL E. FOSTER.

IMPROVEMENT IN HOT-AIR FURNACES.

Specification forming part of Letters Patent No. 44,835, dated October 25, 1864; reissue No. 6,727, dated November 2, 1875; application filed January 27, 1875.

*To all whom it may concern:*

Be it known that SAMUEL E. FOSTER, deceased, in his lifetime a resident of Fitchburg, in the county of Worcester and State of Massachusetts, did invent a new and useful Improvement in Coal-Burning Heaters, of which the following is a specification:

The principal features of improvement which constitute this invention consist, first, in constructing the grate or fire-bed of a heater of a series of bars, upon the side or top surfaces of which, or both, there are formed serrations or teeth, the object being to facilitate the removal of clinkers and other refuse without discharging the unburnt fuel, to accomplish which a vibrating motion is given to the separate bars, whereby the said clinkers and other refuse are more or less broken up by the serrations or teeth, and allowed to fall into the ash-pit on the front; second, in combining such a construction of bars, substantially as described, with a fire pot or chamber, which is cut away in front, immediately above the top surface of the same, thus forming an open space between the two, and a doorway or opening placed in the outer case of the structure and opposite said open space, and a free passage for the clinkers and other refuse between the front ends of said bars and the said outer case, so that free access can be had through such doorway or opening to vibrate said bars, and by which operation the said clinkers and other refuse are worked forward and dropped into the ash-pit; third, in constructing the grate-bars to project beyond the inside wall of the fire pot or chamber on the front, so that fuel shall not fall unburned into the ash-pit when the said bars are vibrated; fourth, in so constructing the ash-pit walls of the heater, relatively to the length of the grate-bars, that a space is left at each end of the latter, to permit of sufficient vibration for effectually cleaning the fire-chamber of clinkers and other refuse; fifth, in providing stops upon the under sides of the grate-bars, in such positions that they will limit the vibrations of the latter by contact with the bearers upon which the same are supported.

Figure 1:
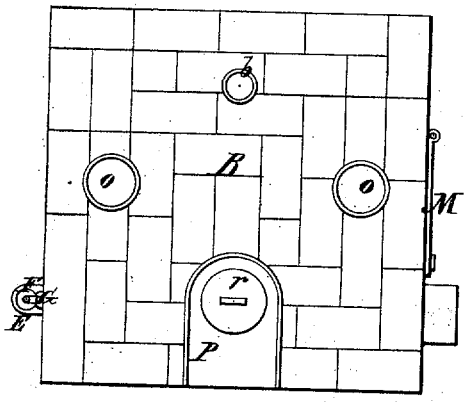
Figure 2:
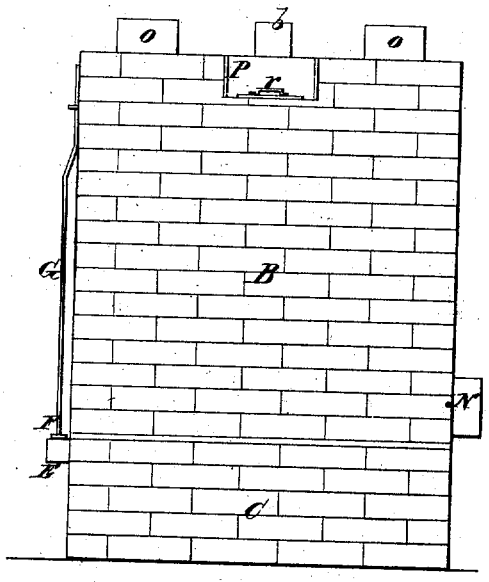
Figure 4:
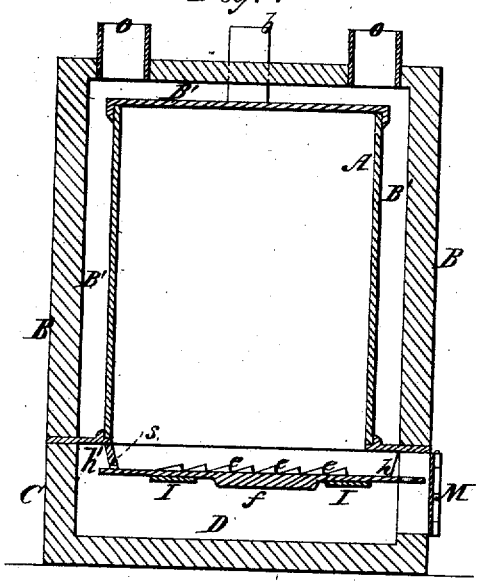
Figure 3:
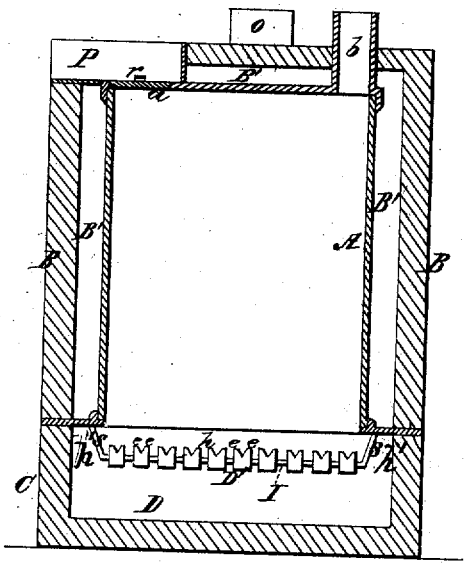
Figure 5:
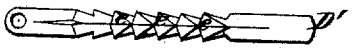
Figure 6:
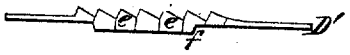

The accompanying drawings show the invention as applied to an ordinary furnace, Figure 1 being a plan of the top; Fig. 2, a side elevation; Figs. 3 and 4, transverse vertical sections at right angles with each other; and Figs. 5 and 6, views in plan and elevation, respectively, of the grate-bar.

Referring to the drawings, A is the fire pot or chamber in which the combustion takes place, and to which fuel is supplied through the opening *a*, closed by the cover *r*, and from which the products of combustion escape through the exit-pipe *b*. B B are the external walls of the heater surrounding the fire pot or chamber, but at such a distance therefrom as to leave a space on all sides between it and the said external walls. B′ B′ is the heating-space, into which cold air is received through the pipe N, and from which, after impinging against the highly-heated walls of the fire pot or chamber, it passes out through the eduction-pipes O O, and from thence to the apartments to be warmed. The bottom of this air-heating space B′ B′ is closed by a horizontal plate, H, upon which the bottom of the fire pot or chamber rests, so that all the air received into the draft-chamber base-section D passes up between and over the front ends of the grate-bars and among the fuel, to promote combustion. P is a depressed channel in the top of the heater, and at one side thereof, to facilitate the introduction of the fuel. C is the base-section which forms the ash-pit and draft-chamber D, and is of greater area than the cylinder A. D is the space below the grate, and constitutes the ash-pit and draft-chamber. D′ D′ are the grate-bars. They collectively make up the grate-surface or fire-bed, and rest upon the cross-bars I I, which are supported by the hangers or pendants *s s*. E is an induction-pipe, through which air is taken into the draft-chamber to feed the fire. The supply is regulated by the damper F, operated by the rod G. M is the door covering the way or opening leading into the draft-chamber base-section, and is made of sufficient height to give access both to the ash-pit D and to the space *h* on the front side between the grate or fire-bed and the lower end of the fire-pot or chamber.

In the drawing the grate-surface or fire-bed is made up of separate bars, and these bars are provided with serrations or teeth *e e* upon their tops and sides, and with stops *f* underneath. The serrations upon the upper surface of the bars are arranged with their greatest height toward the front of the structure, by which means the clinkers and other refuse which are not broken up by the serrations on the top and sides of the bars and discharged into the ash-pit, are moved forward by the vibrating motion of the bars and discharged over the front end of same; also into the ash-pit.

By the operation of this device the fire can be kept burning brightly for an indefinite period without taking it down and rekindling.

Inasmuch as it is designed thus to draw the clinkers and other refuse over the outer edge of the grate or fire-bed into the ash-pit in front, the latter should be constructed of a larger horizontal area than the area of the grate or fire bed, and therefore of larger area than the area of the inside of the base of the fire-pot or chamber.

The relative size of the base-section to the grate or fire-bed thus made leaves a vertical space between the front and rear edges of the latter and the walls of the former. This vertical space it will be seen is of great importance to the successful operation of the grate or fire-bed, as it allows the bars composing the same to be vibrated backward and forward, for the purpose hereinbefore described, and without any waste of unburned coal into the ash-pit.

The stops *f* underneath the grate-bars are of somewhat less length than the distance between the cross-bars I I, and designed to limit the backward and forward movement of the former while while being shaken. This movement is produced by means of a hook inserted in the holes provided for that purpose at their front ends. The opening between their top surface and the base of the fire pot or chamber in front, renders it necessary for the former to project outward beyond the inside of the base of the latter; otherwise the unburned coal, as it settles down below the top of this opening, would flow over the ends of the said bars and fall with the refuse into the ash-pit.

What is claimed as the invention of the said SAMUEL E. FOSTER, is—

1. The grate or fire-bed of a heater composed of a series of toothed or serrated bars adapted to vibrate longitudinally, substantially as shown and described.

2. The combination of a grate or fire-bed composed of a series of toothed or serrated bars adapted to vibrate longitudinally, and the open space between the top surface of the same and the base of the fire pot or chamber on the front, substantially as shown and described.

3. The combination of a grate or fire-bed composed of a series of toothed or serrated bars adapted to vibrate longitudinally and the vertical spaces between the front and rear outer edges of said grate or fire-bed and the walls of the draft-chamber base-section, substantially as shown and described.

4. The combination of a grate or fire-bed composed of a series of toothed or serrated bars, the open space between the top surface of the grate or fire-bed and the base of the fire pot or chamber on the front, the vertical spaces between the front and rear outer edges of the same and the walls of the draft-chamber base-section, said grate or fire-bed being of greater length from front to rear than the corresponding diameter of the fire pot or chamber at its base, substantially as shown and described.

5. The combination of a grate or fire-bed composed of a series of toothed or serrated bars, adapted to vibrate longitudinally with a doorway or opening opposite the same, substantially as shown and described.

6. The combination of a grate or fire-bed composed of a series of toothed or serrated bars, adapted to vibrate longitudinally with a draft-chamber base-section of larger area front and rear than the grate or fire-bed, substantially as shown and described.

7. The combination of a grate or fire-bed composed of a series of toothed or serrated bars, adapted to vibrate longitudinally with the stops *f* on the base of said bars, substantially as shown and described.

WILLIAM E. HENRY,
*Administrator.*

Witnesses:
J. M. WOODBURY,
J. GARFIELD.